Feb. 5, 1929.

H. C. KASTER 1,700,765

MEAT PATTY MOLD AND DISPENSER DEVICE

Filed May 3, 1926

Inventor:
Henry C. Kaster.
By
Attorney.

Patented Feb. 5, 1929.

1,700,765

UNITED STATES PATENT OFFICE.

HENRY C. KASTER, OF ST. LOUIS, MISSOURI.

MEAT PATTY MOLD AND DISPENSER DEVICE.

Application filed May 3, 1926. Serial No. 106,392.

My invention relates to a hamburger meat patty mold and dispenser device, and, has for its object to provide novel means for cutting out from a large mass of meat, a regularly formed patty and discharging the patty from the device, so as to combine rapidity of formation with neatness of form in discharging the patty from the device.

A further object of the invention is to provide the device with thumb actuated means for loosening the meat patty from within the mold to readily discharge the meat patty therefrom.

A further object of the invention is to provide a hamburger meat patty mold and dispenser device which possesses advantages in points of simplicity and efficiency, and, at the same time proves itself comparatively inexpensive in manufacture.

With the above and other objects in view, the invention consists in the novel features of contruction, arrangement and combination of parts hereinafter fully described and finally pointed out in the claim hereto appended.

Referring to the accompanying drawings forming a part of this specification, wherein like characters of reference denote similar parts throughout the several views.

Figure 1:
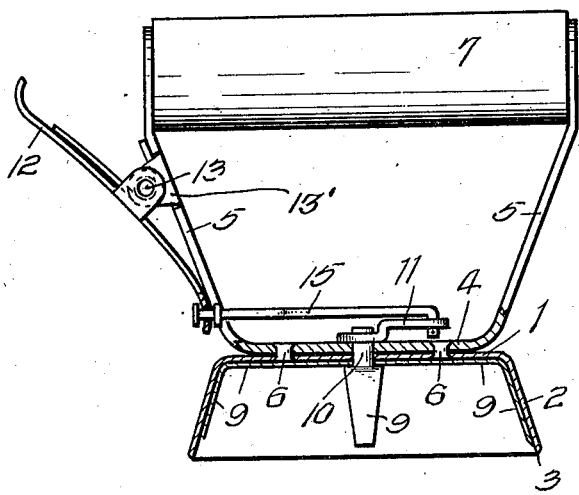
Fig. 1, is a view partly in side elevation and partly in sectional elevation of a device embodying the features of my invention.
Figure 2:
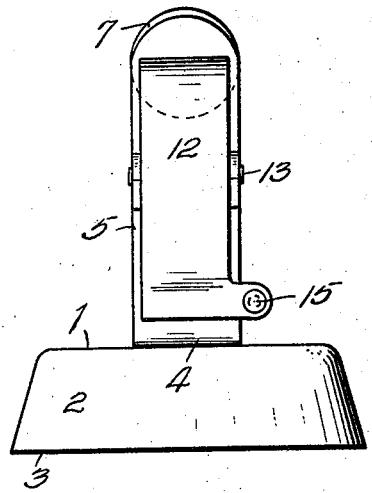
Fig. 2, is an end elevation of the device.
Figure 3:
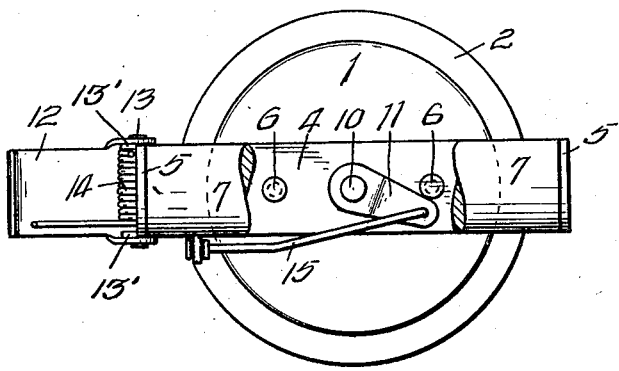
Fig. 3, is a top plan view thereof with a portion of the handle broken away.
Figure 4:
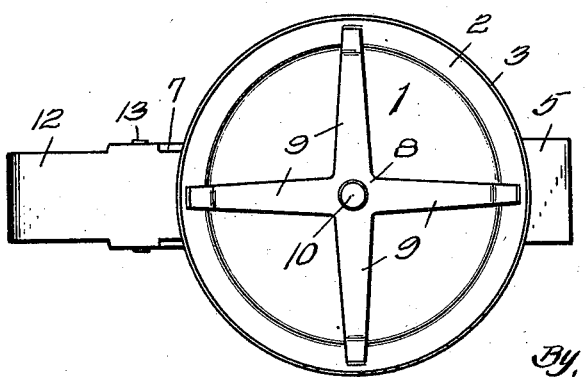
Fig. 4, is a bottom plan view thereof.

In carrying out the aim of my present invention, I employ a suitable truncated mold consisting of an inverted pan shaped receptacle having a flat top 1, the tapered wall 2, the edge 3 of which may or may not be sharpened, as desired.

A suitable support 4 having the opposed upwardly directed arms 5 is positioned upon and fixed to the outer face of the top 1 of the mold by means of suitable fastening devices 6, such for instance as rivets. A suitable wooden or equivalent handle 7 is positioned between the upper ends of the arms 5 and suitably fixed thereto so that the device can be handled by means of one hand.

A suitable patty discharge spider member 8 having four arms 9 is disposed within the patty mold with the arms so bent as to engage the inner face of the top 1 and the inner face of the side wall 2. The spider member 8 is suitably fixed to the lower end of a suitable rock shaft, or pin 10, which shaft or pin passes upwardly through the top 1 and support 4 centrally of the top 1. A suitable arm 11 is suitably fixed to the rock shaft or pin 10 above the support 4.

The reference numeral 12 represents a suitable thumb actuated trigger which is pivotally connected as at 13 to ears 13' carried by one of the arms 5 of the support 4. A suitable coiled spring 14 encircles the pivot pin 13 and has one end thereof engaging the inner face of the upper end of the trigger while the opposite end of the coiled spring 14 engages the outer face of one of the support arms 5 to normally hold the upper end of the trigger away from the arm 5 and the lower end of the trigger in contact with the arm 5. The lower end of the trigger 12 is suitably connected with the outer end of the arm 11 of rock shaft 10 by means of a suitable connecting link 15.

The operation of the device is as follows:

When it is desired to form meat patties, such as hamburger meat patties, or the like, of uniform thickness and size, the operator will first roll out a mass of meat upon a table, or the like, to substantially the thickness of the patties desired, although not necessarily so. The operator grasps the handle 7 of the device with one hand and will then force the mold into the meat upon the table, or the like, thereby causing the mold to be filled with the meat. By applying pressure to the handle and partially rotating device several times, the edge 3 will cut any stringy portions of the mass to freely separate the patty formed within the mold from the mass. After the operator has severed the patty from the mass, he then places his thumb of the hand grasping the handle 7 upon the upper end of the trigger 12 moving it toward the end of the handle which will cause the lower end of the trigger to move outwardly thereby causing the connecting link 15 to pull the outer end of the arm 11 in an arcuate path which, in turn, will impart a partial rotary movement to the pivot pin 10 and spider 8. The partial rotary movement of the spider 8 will readily loosen the meat patty from the inner face of the mold to permit it to be easily discharged therefrom.

From the foregoing description, it is apparent that all patties formed will be of uniform size and thickness and consequently of substantially equal weight, thereby resulting in the saving of meat over the old method of forming meat patties by hand.

The many advantages of the herein described invention will readily suggest themselves to those skilled in the art to which it appertains.

I do not desire to be understood as limiting myself to the exact details of construction and arrangement of parts as herein described and illustrated, as it is manifest that variations and modifications may be made without departing from the spirit and scope of my invention and the terms of the following claim, hence I wish it to be understood that I reserve the right to make any such changes, or modifications as may fairly fall within the scope of the appended claim when fairly construed.

What I claim is:

In a meat patty former and dispenser, a shallow cup-shaped receptacle, a scraping spider within the receptacle, the arms of which spider engage both the top and side walls of the receptacle, a handle fixed to and directed upwardly from and above the receptacle, ears formed on said handle, a trigger pivotally connected to said ears adjacent one end of the handle, a spring between the handle and the trigger, an ear having an opening at the lower end of the trigger, a stem fixed to the spider and passing through the receptacle, an arm fixed to and extending from said stem and a connection between the arm and the ear at the lower end of the trigger.

In testimony whereof I have hereunto affixed my signature.

HENRY C. KASTER.